United States Patent
Dong et al.

(10) Patent No.: US 10,204,618 B2
(45) Date of Patent: Feb. 12, 2019

(54) TERMINAL AND METHOD FOR VOICE CONTROL ON TERMINAL

(71) Applicant: HISENSE MOBILE COMMUNICATIONS TECHNOLOGY CO., LTD., Qingdao (CN)

(72) Inventors: Tiantian Dong, Qingdao (CN); Wenjuan Du, Qingdao (CN); Gang De, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 14/935,701

(22) Filed: Nov. 9, 2015

(65) Prior Publication Data
US 2016/0300567 A1    Oct. 13, 2016

(30) Foreign Application Priority Data
Apr. 13, 2015   (CN) .......................... 2015 1 0172797

(51) Int. Cl.
*G10L 17/00*     (2013.01)
*G10L 15/08*     (2006.01)
*G10L 15/22*     (2006.01)

(52) U.S. Cl.
CPC ........ *G10L 15/08* (2013.01); *G10L 2015/221* (2013.01); *G10L 2015/223* (2013.01)

(58) Field of Classification Search
CPC ......... G10L 17/00; G10L 17/22; G10L 17/26; G10L 1015/00; G10L 1015/06;
(Continued)

(56) References Cited

U.S. PATENT DOCUMENTS 9,262,612 B2 *   2/2016   Cheyer .................. G06F 21/32
9,430,186 B2 *   8/2016   Faaborg ................. G06F 3/167
(Continued)

FOREIGN PATENT DOCUMENTS

CN         101807395 A     8/2010
CN         102510426 A     6/2012
(Continued)

*Primary Examiner* — Qi Han
(74) *Attorney, Agent, or Firm* — Harness, Dickey & Pierce, P.L.C.

(57) ABSTRACT

The application relates to a terminal and method for voice control on a terminal. A terminal according to some embodiments of the application includes: one or more processors, and a memory, wherein, the memory stores therein one or more computer readable program codes, and the processor or processors are configured to execute the one or more computer readable program codes, to match voice information in a voice instruction with preset voice information in the terminal upon reception of the voice instruction comprising the voice information and instruction information, to perform an operation corresponding to the instruction information upon determining successful matching, and to reject the operation corresponding to the instruction information upon determining unsuccessful matching.

17 Claims, 4 Drawing Sheets

(58) Field of Classification Search
CPC ............ G10L 1015/22; G10L 1015/223; G10L 1015/226; G10L 1015/227; G10L 1015/228; G10L 15/00; G10L 15/06; G10L 15/22; G10L 15/223; G10L 15/226; G10L 15/227; G10L 15/228
USPC .................. 704/275, 246, 249, 251, 273
See application file for complete search history.

(56) References Cited

U.S. PATENT DOCUMENTS

| | | | |
|---|---|---|---|
| 2005/0021341 A1* | 1/2005 | Matsubara | G10L 15/07 704/275 |
| 2012/0245941 A1* | 9/2012 | Cheyer | G06F 21/32 704/246 |
| 2013/0160110 A1* | 6/2013 | Schechter | G06F 21/629 726/19 |
| 2013/0325484 A1 | 12/2013 | Chakladar et al. | |
| 2016/0351191 A1* | 12/2016 | Vilermo | G10L 15/22 |

FOREIGN PATENT DOCUMENTS

| | | |
|---|---|---|
| CN | 103051781 A | 4/2013 |
| CN | 103458090 A | 12/2013 |
| CN | 103594089 A | 2/2014 |
| CN | 103730120 A | 4/2014 |

* cited by examiner

TERMINAL AND METHOD FOR VOICE CONTROL ON TERMINAL

CROSS-REFERENCE TO RELATED APPLICATION

This application claims the benefit and priority of Chinese Patent Application No. 201510172797.8 filed Apr. 13, 2015. The entire disclosure of the above application is incorporated herein by reference.

FIELD

The present disclosure relates to the field of voice recognition and particularly to a terminal and method for voice control on a terminal.

BACKGROUND

This section provides background information related to the present disclosure which is not necessarily prior art.

Voice recognition has been widely applied to various electronic devices and human-machine interaction along with rapid development of wireless communications. For various interactive terminals including handsets, tablet computers, etc., voice recognition is typically applied into a function module similar to a voice assistant and a searcher so that the terminals match the received voice with data in the terminals (or over the Internet) and then feed a preset result back to users via machine talk (or machine talk and a text prompt).

SUMMARY

This section provides a general summary of the disclosure, and is not a comprehensive disclosure of its full scope or all of its features.

In an aspect, some embodiments of the application provide a method for voice control on a terminal, the method including:

matching, by the terminal, voice information in a voice instruction with preset voice information in the terminal upon reception of the voice instruction including the voice information and instruction information;

performing an operation corresponding to the instruction information upon determining successful matching; and rejecting the operation corresponding to the instruction information upon determining unsuccessful matching.

In another aspect, some embodiments of the application further provide a method for voice control on a terminal, the method including:

matching, by the terminal, voice information in a voice instruction with preset voice information in the terminal upon reception of the voice instruction including the voice information and instruction information;

performing an operation corresponding to the instruction information, and displaying a visualization image corresponding to the operation on a display screen, upon successful matching.

In still another aspect, some embodiments of the application further provide a terminal including:

one or more processors; and a memory, wherein:

the memory stores therein one or more computer readable program codes, and the processor or processors are configured to execute the one or more computer readable program codes:

to match voice information in a voice instruction with preset voice information in the terminal upon reception of the voice instruction including the voice information and instruction information;

to perform an operation corresponding to the instruction information upon determining successful matching; and to reject the operation corresponding to the instruction information upon determining unsuccessful matching.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

A terminal according to some embodiments of the application includes but will not be limited to a handset, a computer, a tablet computer, etc.

Figure 1:
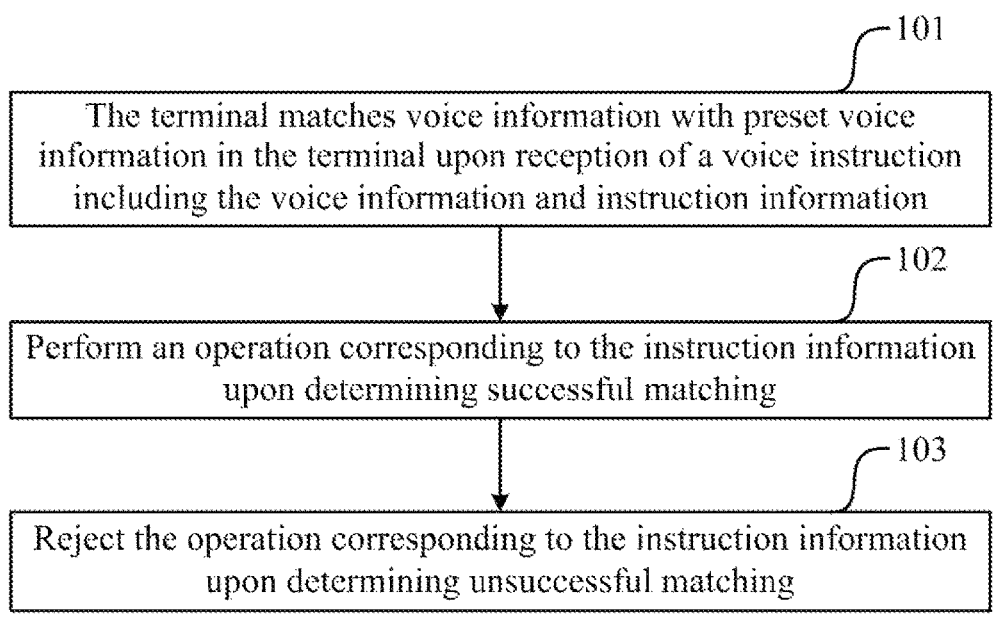
FIG. 1 illustrates a schematic flow chart of a method for voice control on a terminal according to some embodiments of the application.

As illustrated in FIG. 1, a method for voice control on a terminal according to some embodiments of the application can include:

Operation 101: the terminal matches received voice information with preset voice information in the terminal upon reception of a voice instruction including the voice information and instruction information;

Operation 102: the terminal performs an operation corresponding to the instruction information upon determining successful matching; and Operation 103: the terminal rejects to perform the operation corresponding to the instruction information upon determining unsuccessful matching.

In some embodiments, after the terminal presets the preset voice information, the terminal can match the voice information in the voice instruction with the previously preset voice information upon reception of the voice instruction (which is a voice instruction including the voice information and the instruction information) sent by a user to determine whether the voice instruction has a privilege to control the terminal; and if there is a successful matching, which indicates that the voice instruction has the privilege to control the terminal, then the terminal can perform the operation corresponding to the instruction information included in the voice instruction; and if there is an unsuccessful matching, which indicates that the voice instruction has no privilege to control the terminal, then the terminal can reject the operation corresponding to the instruction information.

Here both the voice information included in the voice instruction and the preset voice information can be a pitch of voice, loudness of the voice, timbre of the voice, amplitude of the voice, frequency of the voice, and other various information which can distinguish voice of one person from that of another. Moreover the voice instruction can further include the instruction information in addition to the voice information.

In some embodiments, the pitch, loudness and timbre of voice included in different voice information may be different, while the pitch of voice may be determined by the frequency of the most significant component in the voice.

Taking the frequency of voice as an example, a description will be given in mathematical equations about how the terminal according to some embodiments of the application can distinguish voice information by the frequency of voice. It shall be noted that the frequency of voice in voice information can be distinguished by the calculation in the following equations without any limitation thereto, but the frequency of voice can be distinguished otherwise without departing from the scope of the application.

For example, if a sound wave is represented as a sine or cosine function, e.g., cost, where w represents the frequency of voice, then any voice f(x) can be represented in the equation of:

$$f(x)=a1\cos w1t+b1\sin w1t+a2\cos w2t+b2\sin w2t+a3\cos w3t+b3\sin w3t+\ldots$$

Where $w_1, w_2, w_3, \ldots$ represent the frequencies of various vibration components included in voice, and a and b represent proportions of the vibration components. The various $w_1, w_2, w_3, \ldots$, and the different a and b included in the voice f(x) represent parameters of timbre. Generally if $w_1, w_2, w_3, \ldots$ are distributed irregularly, then the voice will sound as noise; and if $w_1, w_2, w_3, \ldots$ are distributed as multiples, then the voice will sound as music.

For example, if there is voice of two persons A and B, both of which speak out "Do", and the key of "Do" is at the frequency of 261.6 Hz (that is, $w_1$=261.6), then the voice of A and B can be represented in the mathematical equations of:

$$f(A)=a1\cos w1t+b1\sin w1t+a2\cos w2t+b2\sin w2t+a3\cos w3t+b3\sin w3t+\ldots$$

$$f(B)=c1\cos w1t+d1\sin w1t+c2\cos w2t+d2\sin w2t+c3\cos w3t+d3\sin w3t+\ldots$$

Where $a_1=c_1$, $b_1=d_1$, $a_n!=c_{an}$ and $b_{an}!=d_{en}$, where n!=1.

As can be apparent from the description above, if both of them speak out "Do", then the sound at this frequency of 261.6 Hz is the most significant voice, so it sounds that both of them speak out "Do", but the other frequencies of their voice are different from each other, so their voice can be distinguished. That is, the pitch is determined by the frequency of the most significant component in voice, and the timbre is determined by differently distributed frequency components, so the terminal can distinguish different voice information by their frequencies.

In some embodiments, a function can be configured as needed to provide different virtual animations corresponding to different loudness of voice, that is, a virtual animation invoked by the terminal can be configured to be affected by the loudness of voice, for example, if the loudness of voice is higher than certain preset decibel, then the terminal can determine a virtual animation corresponding to the loudness of the voice at this time (e.g., present an expression showing a doubt or scare) according to a correspondence relationship between the loudness of voice and the virtual animation; and if the loudness of voice is lower than certain preset decibel, then the terminal will not display a virtual animation no matter whether the voice information is matched successfully.

In order to configure the terminal with an additional function to diversify voice control on the terminal, some embodiments of the application can store some voice information as preset by the user, as preset by the terminal by default, etc. For example such voice information can be set as voice information of an owner of the terminal, and the terminal can be controlled only if the received voice information is the voice information of the owner (i.e., the preset voice information), so that personal privacy and rights of the owner can be protected to some extent to thereby improve the security thereof in use.

Since the terminal according to some embodiments of the application can distinguish voice of the owner from that of another person so that the terminal can make different responses to the different voice. Also a virtual animation in full screen can be presented to show a particular expression as prompt information to thereby greatly enhance the capability of visual prompt so that the user can have clear and lively perception of the process from reception by the terminal of the instruction to making by the terminal of the response to thereby improve the efficiency and the perception of the experiencing user.

In some embodiments, the terminal can make different responses to different results of matching the received voice information with the preset voice information, and also can display different virtual animations as prompts according to the different results of matching the received voice information with the preset voice information.

In some embodiments, the received voice information is consistent with the preset voice information.

After it is determined that there is a successful matching, a first virtual animation corresponding to the instruction information can be determined and displayed according to a correspondence relationship between the instruction information and the first virtual animation.

After it is determined that the received voice information is matched successfully with the preset voice information, the first virtual animation displayed by the terminal can be one of a preset first set of virtual animations. For example, a set of animated expressions (including a number of different animated expressions including making a call, sending a message, unlocking, etc.) can be preset, and instruction information to control the terminal can be set as needed, so that each piece of instruction information can correspond respectively to one of the virtual animations (i.e., the first virtual animation), and the virtual animation can be related to the contents of the instruction information, for example, instruction information of "Send a short message to XXX" corresponds to a virtual animated expression of sending a short message, and instruction information of "Call XXX" corresponds to a virtual animated expression of making a call.

After it is determined that the received voice information is matched successfully with the preset voice information, which indicates that the voice instruction has the privilege to control the terminal, the terminal can determine the virtual animation corresponding to the received instruction information according to the created correspondence relationship between the instruction information and the first virtual animation, and display the determined virtual animation on the terminal.

For example, the user A can preset his or her voice information as preset voice information in his or her handset, and after the handset receives a voice instruction of "Call Mr. San Zhang" given by the user A (which is a voice instruction including voice information and instruction information), the handset can match the voice information in the received voice instruction of "Call Mr. San Zhang" with the voice information of the user A (i.e., the preset voice information), and determine whether the voice instruction has a privilege to control the handset; and if there is a successful matching, then the handset can operate to call Mr. San Zhang, according to the instruction information in the voice instruction; and also determine and display an animated expression of making a call, corresponding to the instruction information (i.e., the first virtual animation) according to the correspondence relationship between the instruction information and the first virtual animation.

In some embodiments, after it is determined that the voice information does not match with the preset voice information, the terminal can alert the user using a second virtual animation different from the first virtual animation displayed upon successful matching.

The terminal can determine the received voice information as other than the preset voice information upon determining unsuccessful matching, and can further determine the second virtual animation corresponding to the other voice information than the preset voice information according to a correspondence relationship between the other voice information than the preset voice information and the second virtual animation.

After it is determined that the voice information is matched unsuccessfully with the preset voice information, the terminal can display the second virtual animation which is one of a preset second set of virtual animations. For example, a set of animated expressions (including a number of different animated expressions including indifference, jeer, ignorance, etc. to alert the user that the voice instruction is invalidated) can be preset, and if the voice information included in the voice instruction received by the terminal is matches unsuccessfully with the preset voice information, then it is determined that the voice information in the received voice instruction is other than the preset voice information, which indicates that the voice instruction has no privilege to control the terminal, then the terminal can determine the virtual animation corresponding to the other voice information than the preset voice information according to the pre-created correspondence relationship between the other voice information than the preset voice information and the second virtual animation, and display the determined virtual animation on the terminal. For example, the terminal can display randomly one of the animated expressions to alert the user that the voice instruction is invalidated.

For example, the user A can preset his or her voice information as preset voice information in his or her handset, and if the handset receives a voice instruction of "Call Mr. San Zhang" given by the user B (which is a voice instruction including the voice information and instruction information), then the handset will match the voice information in the received voice instruction of "Call Mr. San Zhang" with the voice information of the user A (i.e., the preset voice information), and determine whether the voice instruction has a privilege to control the handset; and since the voice information of the user B is not the preset voice information, i.e., is not the voice information of the user A, then there is an unsuccessful matching, so that the handset can reject the operation to call Mr. Zhang; and also determine and display the animated expression of ignorance corresponding to the other voice information than the preset voice information (i.e., the second virtual animation) according to the correspondence relationship between the other voice information than the preset voice information and the second virtual animation for a preset length of time (e.g., three seconds), after which the animated expression disappears. Alternatively, the handset will not make any response to the voice instruction given by the user B upon determining unsuccessful matching.

In some embodiments, before the received voice information is matched with the preset voice information in the terminal, it can be firstly determined whether a condition to perform an operation of matching is satisfied:

For example, before the terminal matches the received voice information with the preset voice information in the terminal, the terminal can firstly determine whether the condition to perform an operation of matching is satisfied, and if the condition to perform an operation of matching is satisfied, then the terminal can perform the operation of matching the received voice information with the preset voice information in the terminal.

In some embodiments, there are a number of conditions to perform an operation of matching.

For example, the condition to perform an operation of matching includes a part or all of the following conditions:

The user triggers a function of the operation of matching; the current time lies in a preset period of time for which the operation of matching needs to be performed; and the current position lies in a preset range in which the operation of matching needs to be performed.

If whether to perform the operation of matching is provided as an option, then the user may or may not select the operation of matching to be performed (that is, select the operation of matching voice information to be triggered or not). For example, the terminal can be configured with a matching voice information function option, and when the terminal is controlled via voice, the operation of matching will be performed only if the function option is selected; or if the function option is not selected, then the terminal can perform any operation corresponding to voice instruction given by the user without firstly matching the voice information.

Alternatively a period of time can be preset so that the terminal can perform the operation of matching in this period of time; and if some instance of time lies exactly in the preset period of time, then the terminal will perform the operation of matching (that is, the current time lies in the preset period of time for which the operation of matching needs to be performed). For example, the user can preset a period of time for which the operation of matching is performed, on the handset as needed, for example, the user presets that the operation of matching voice information needs to be performed between 10 a.m. and 5 p.m. That is, the handset can be controlled by the voice information of the owner only in the period of time from 10 a.m. to 5 p.m.; and the terminal can perform any operation corresponding to the voice instruction given by the user in the other period of time without matching the voice information.

Alternatively a positional range can be preset, and if the terminal is located in this positional range, then the operation of matching voice information will be performed; or if the terminal is situated in some special situation or operating some preset software, then the operation of matching voice information will be performed. For example, the user can preset that the operation of matching can be performed when some particular application is started.

In this application, the preset voice information is a piece of voice information preset as reference information for recognition in matching, where the preset voice information can be preset in a number of ways.

In some embodiments, before the received voice information is matched with the preset voice information in the terminal, the user can be asked to input voice information, and the preset voice information can be determined from voice information received in a first preset length of time upon determining that the user clicks on a button or an icon to enter voice information; or In some other embodiments, if a microphone operates for a second preset length of time, then the terminal can collect all of sound information input though the microphone, and recognize voice information corresponding to the collected sound information; and record the recognized respective voice information and their corresponding input durations respectively, and preset the recorded voice information with the longest input duration as the preset voice information.

That is, the terminal can preset the preset voice information in a number of different ways, for example, the user is asked to input preset voice information by himself or herself when this function is enabled for the first time; and after the user clicks the button or the icon to input voice information, the terminal determines the preset voice information from voice information among sound information input for a period of time (i.e., the first preset length of time).

Alternatively if the user inputs a voice message into the terminal, for example, makes a call, records a voice message, sends a voice message, etc. (that is, the microphone is operating), in some period of time, e.g., three days (i.e., the second preset length of time), then the terminal can collect all of sound information input or transmitted by the microphone, e.g., all of sound information of the user making calls using the handset in the three days; and recognize voice information corresponding to the collected sound information, that is, recognize voice information included among all the sound information; and The terminal records the recognized respective voice information and their corresponding input durations respectively, for example, only the two users A and B make call in the three days, so the handset will recognize two pieces of different voice information of the users A and B, and also record input durations corresponding to the respective voice information respectively as three minutes and fifty minutes; and preset the recorded voice information with the longest input duration of fifty minutes as the preset voice information. That is, the terminal can collect all the voice of the user including making a call, recording a voice message, sending a voice message, etc., and determine the voice information with the longest input duration, input from the present terminal in the three days as the voice information of the owner.

In some embodiments, if the owner of the terminal is changed, then the user can invoke an interface with virtual animation to record new preset voice information with which the voice information of the original owner (i.e., the preset voice information) is overwritten, and can configure as needed the terminal to collect and recognize in real time the voice information input through the microphone as revision voice information under some condition (for example, when the user chooses to revise the preset voice information) so that the terminal can match the voice by matching the voice information in the received voice instruction with both the collected revision voice information and the voice information of the owner (i.e., the preset voice information). For example, if the voice of the user is changed for some period of time because he or she catches a cold, then the terminal can determine the voice information of the owner according to the normally recorded revision voice information and the preset voice information to thereby give the matching result more accurately so as to avoid such a situation from occurring that the terminal cannot be controlled via voice due to the change in voice arising from catching a cold.

Figure 2:
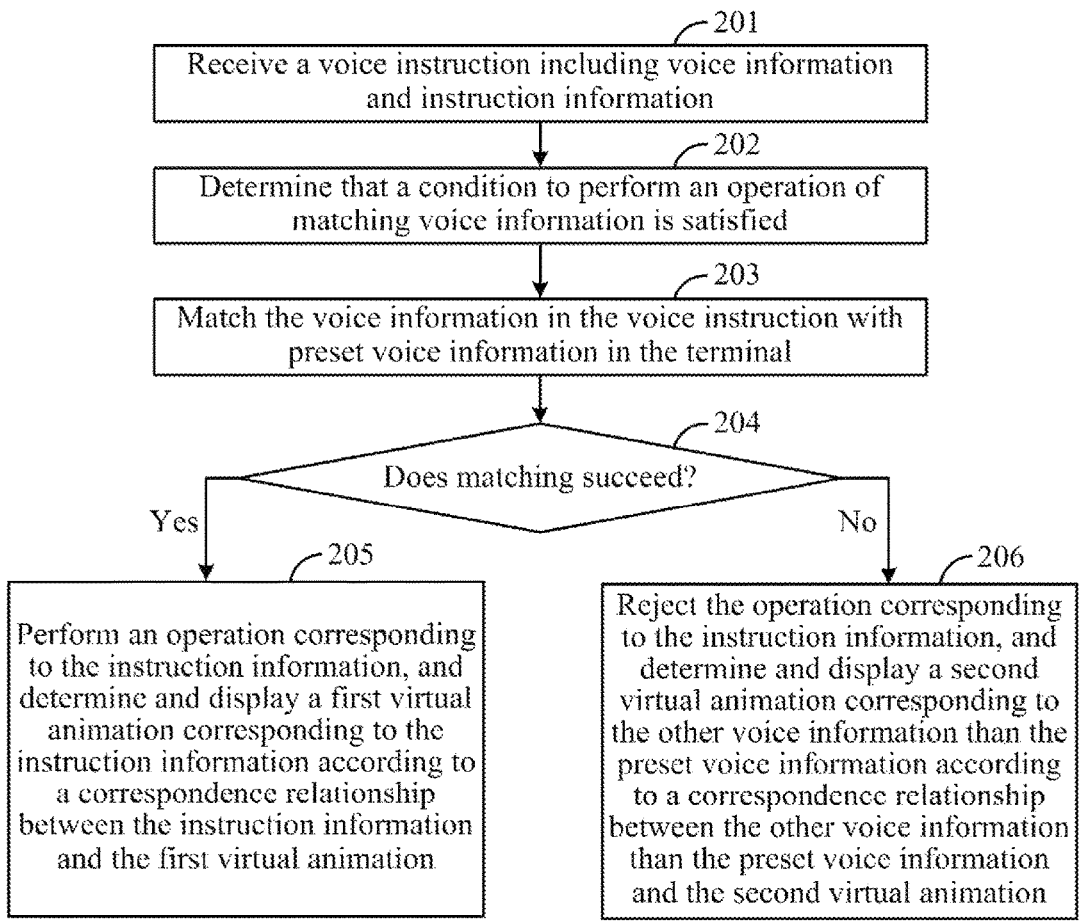
FIG. 2 illustrates a schematic flow chart of another method for voice control on a terminal according to some embodiments of the application.
Figure 3:
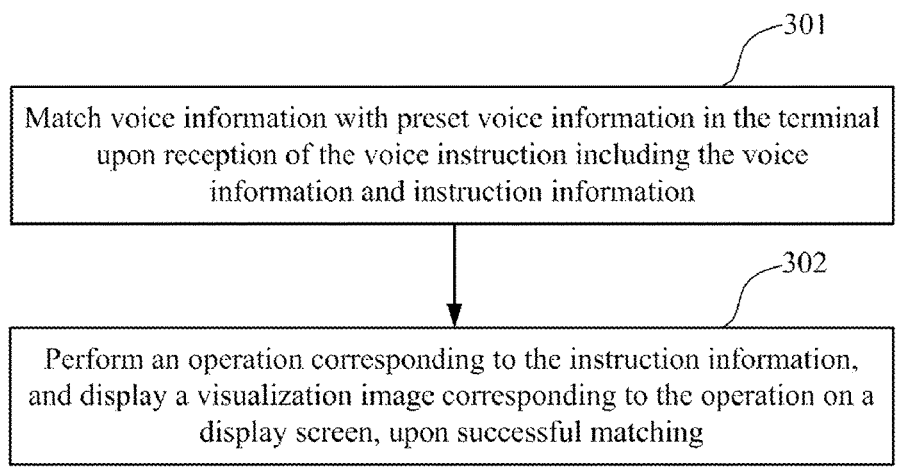
FIG. 3 illustrates a schematic flow chart of another method for voice control on a terminal according to some embodiments of the application.

As illustrated in FIG. 2, there is illustrated a schematic flow chart of another method for voice control on a terminal according to some embodiments of the application, where the method includes the following operations:

Operation 201: receiving a voice instruction including voice information and instruction information;

Operation 202: determining that a condition to perform an operation of matching voice information is satisfied;

Operation 203: matching the voice information in the voice instruction with preset voice information in the terminal, and the flow proceeds to the operation 204;

Operation 204: determining whether matching succeeds, and if there is a successful matching, then the flow proceeds to the operation 205; otherwise, the flow proceeds to the operation 206;

Operation 205: performing an operation corresponding to the instruction information in the voice instruction, and determining and displaying a first virtual animation corresponding to the instruction information according to a correspondence relationship between the instruction information and the first virtual animation; and Operation 206: determining the voice information in the voice instruction as other than the preset voice information, rejecting the operation corresponding to the instruction information in the voice instruction, and determining and displaying a second virtual animation corresponding to the other voice information than the preset voice information according to a correspondence relationship between the other voice information than the preset voice information and the second virtual animation.

Moreover some embodiments of the application further provide a method for voice control on a terminal, where the method can include:

Operation S301: the terminal matches voice information in a voice instruction with preset voice information in the terminal upon reception of the voice instruction including the voice information and instruction information; and Operation S302: the terminal performs an operation corresponding to the instruction information, and displays a visualization image corresponding to the operation on a display screen, upon successful matching.

In some embodiments, the terminal can perform the operation corresponding to the instruction information only after the voice information in the voice instruction is matched successfully with the preset voice information in the terminal, so only a particular user has a privilege to operate the terminal. Moreover in some embodiments, the visualization image can be distributed in any size or shape at any position on the display screen, for example, it can be distributed in the shape of a square or a rectangle centrally on the display screen or in an upper half or a lower half of the display screen; or the visualization image can be distributed exactly throughout the display screen. The visualization image corresponding to the operation can be displayed on the display screen so that the terminal will present the current operation more intuitively to provide the user with better visual perception.

The voice information in the voice instruction and the preset voice information in the terminal can be defined the same as or similarly to the voice information in the voice instruction and the preset voice information in the terminal according to the embodiments above.

In some embodiments, the visualization image can be a static picture or a dynamic image. For example, if the operation corresponding to the instruction information is to make a call, then the corresponding visualization image can be a static picture or a dynamic image with a symbol or a sign of a phone; and if the operation corresponding to the instruction information is to send a short message, then the corresponding visualization image can be a static picture or a dynamic image with a mailbox symbol, a mailbox sign or a letter paper sign.

In some embodiments, the visualization image can include a human image, an animal image, a plant image, a mechanical structure image, a cartoon image and/or an animated image. The visualization image can be a static or dynamic human image, animal image, plant image, mechanical structure image, cartoon image and/or animated image.

In some embodiments, the visualization image can further include an image expression which can correspond to the operation corresponding to the instruction information. The image expression can be an expression showing an emotion including happiness, anger, sorrow, joy, etc., in a human image or a cartoon image. For example, the visualization image can be a static or dynamic human expression image, animal expression image, plant expression image, cartoon expression image and/or animated expression image.

Figure 4A:
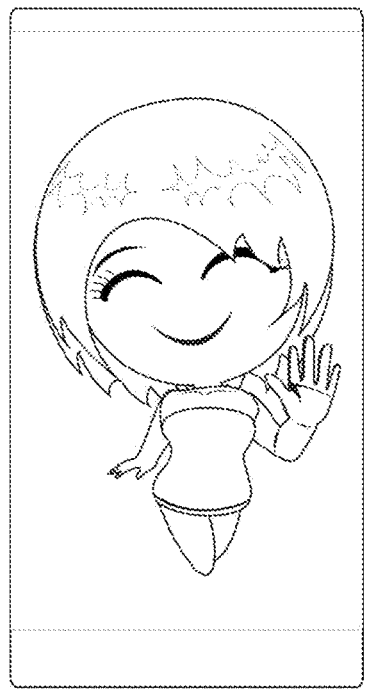
FIG. 4A illustrates a part or all of a visualization image for welcome according to some embodiments of the application.
Figure 4B:
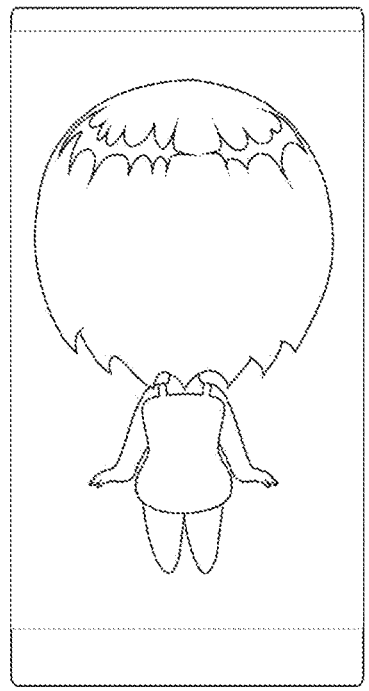
FIG. 4B illustrates a part or all of a visualization image for rejection according to some embodiments of the application.

In some embodiments, after the voice information in the voice instruction is matched successfully with the preset voice information in the terminal, the visualization image for welcome can be displayed on the display screen of the terminal to indicate successful matching to the user intuitively, and the user can operate the terminal, for example, the welcoming visualization image can include the image as illustrated in FIG. 4A.

In some embodiments, after the voice information in the voice instruction is matched unsuccessfully with the preset voice information in the terminal, the visualization image for rejection can be displayed on the display screen of the terminal to indicate unsuccessful matching to the user intuitively, and the user cannot operate the terminal, for example, the rejecting visualization image can include the image as illustrated in FIG. 4A.

It shall be noted that the virtual animation in the embodiments above can have the same or similar attribute or function as or to that of the visualization image.

Figure 5:
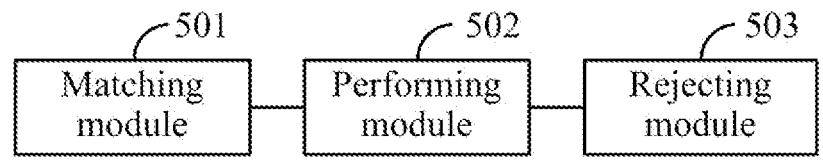
FIG. 5 illustrates a schematic structural diagram of modules in a terminal according to some embodiments of the application.

As illustrated in FIG. 5, some embodiments of the application further provide a terminal controlled via voice, where the terminal can perform the method for voice control according to some embodiments above, or the method for voice control according to some embodiments above can be performed by the terminal. The terminal can include:

One or more processors; and

A memory, where:

The memory stores therein one or more computer readable program codes, and the processor or processors are configured to execute the one or more computer readable program codes to perform functions of:

A matching module 501 is configured to match voice information in a received voice instruction with preset voice information in the terminal upon reception of the voice instruction including the voice information and instruction information;

A performing module 502 is configured to perform an operation corresponding to the instruction information in the voice instruction upon determining successful matching; and A rejecting module 503 is configured to reject the operation corresponding to the instruction information in the voice instruction upon determining unsuccessful matching.

In some embodiments, the performing module 502 can be further configured:

To determine and display a first virtual animation corresponding to the instruction information according to a correspondence relationship between the instruction information and the first virtual animation upon determining successful matching.

In some embodiments, the rejecting module 503 can be further configured:

To determine the voice information in the voice instruction as other than the preset voice information upon determining unsuccessful matching, and to determine and display a second virtual animation corresponding to the other voice information than the preset voice information according to a correspondence relationship between the other voice information than the preset voice information and the second virtual animation.

In some embodiments, the matching module 501 can be further configured:

To determine whether a condition to perform an operation of matching voice information is satisfied, before matching the voice information in the voice instruction with the preset voice information in the terminal;

Where the condition to perform an operation of matching voice information includes a part or all of the following conditions:

A user triggers a function of the operation of matching voice information;

The current time lies in a preset period of time for which the operation of matching voice information needs to be performed; and The current position lies in a preset range in which the operation of matching voice information needs to be performed.

In some embodiments, the matching module 501 is further configured:

Before the voice information in the voice instruction is matched with the preset voice information in the terminal, to ask a user to input voice information, and to determine the preset voice information from voice information received in a first preset length of time upon determining that the user clicks on a button or an icon to input voice information; or if a microphone operates for a second preset length of time, to collect all of sound information input through the microphone, and to recognize voice information corresponding to the collected sound information; and to record the recognized respective voice information and their corresponding input durations respectively, and to preset the recorded voice information with the longest input duration as the preset voice information.

It shall be noted that the terminal structured as illustrated in FIG. 5 above can perform any one of the method for voice control on a terminal according to the embodiments above.

Figure 6:
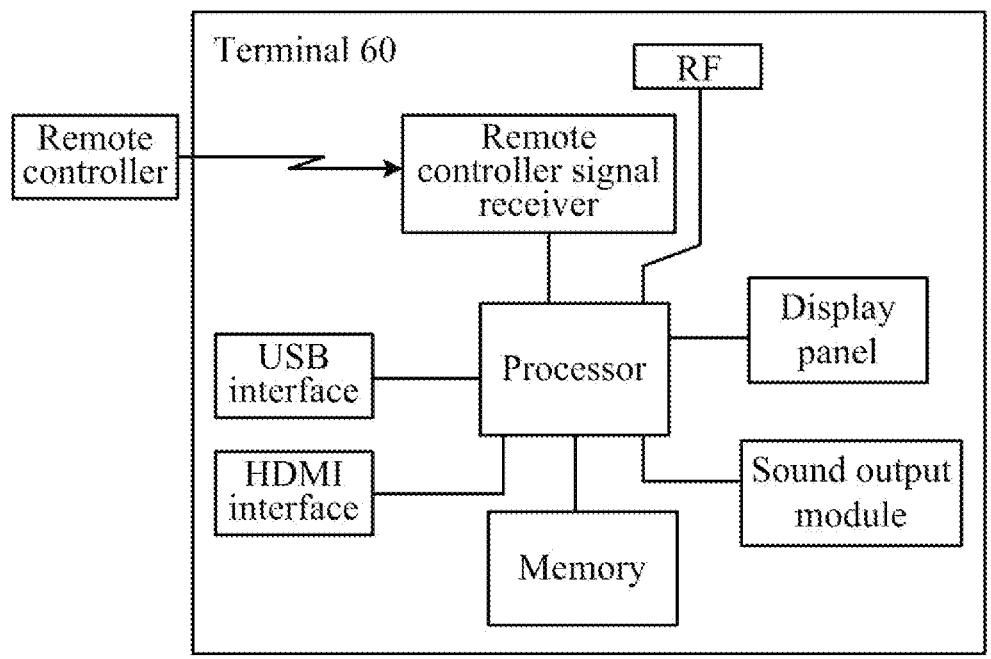
FIG. 6 illustrates a schematic structural diagram of a terminal according to some embodiments of the application.

By way of an example, the terminal according to some embodiments of the application can be structured as illustrated in FIG. 6, where the terminal 60 can include a memory, an input unit, an output unit, one or more processors, and other components. Those skilled in the art can appreciate that the structure of the terminal illustrated in FIG. 6 will not be limited on the terminal but can include more or less components than those as illustrated or some of the components can be combined or different components can be configured.

The memory can be configured to store software programs and modules, and the processor is configured to run the software programs and modules stored in the memory to thereby perform various function applications and data processes. The memory can include a high-speed random access memory and can further include a nonvolatile memory, e.g., at least one magnetic-disk memory device, a flash memory device or another volatile solid memory device. Furthermore the memory can further include a memory controller configured to provide an access of the processor and the input unit to the memory.

The processor is a control center of the terminal 60 and has the respective components of the entire smart terminal connected by various interfaces and lines. The processor can run or execute the software programs and/or modules stored in the memory and invoke the data stored in the memory to perform the various functions of the terminal and process the data to thereby manage and control the terminal as a whole. Alternatively, the processor can include one or more processing cores, or can be integrated with an application processor and a modem processor, where the application processor generally handles an operating system, user interfaces, applications, etc., and the modem processor generally handles wireless communication. As can be appreciated, the modem processor may not be integrated into the processor.

The terminal 60 can include a TV and radio receiver, a High-Definition Multimedia (HDMI) interface, a USB interface, an audio and video input interface, and other input units. The input units can further include a remote controller receiver to receive a signal sent by a remote controller. Moreover the input units can further include a touch sensitive surface and other input devices, where the touch sensitive surface can be embodied in various types of resistive, capacitive, infrared, surface sound wave and other types, and the other input devices can include but will not be limited to one or more of a physical keyboard, functional keys (e.g., a power-on or-off press key, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by a user or information provided to the user and various graphic user interfaces of the terminal, where these graphic user interfaces can be composed of graphics, texts, icons, videos and any combination thereof. For example, the display panel can be embodied as a Liquid Crystal Display (LCD), an Organic Light-Emitting Diode (OLED), a flexible display, a 3D display, a CRT, a plasmas display panel, etc.

The terminal 60 can further include at least one sensor (not illustrated), e.g., an optical sensor, a motion sensor and other sensors. Particularly the optical sensor can include an ambient light sensor and a proximity sensor, where the ambient optical sensor can adjust the brightness of the display panel according to the luminosity of ambient light rays, and the proximity sensor can power off the display panel and/or a backlight when the terminal 60 moves to some position. The terminal 60 can be further configured with a gyroscope, a barometer, a hygrometer, a thermometer, an infrared sensor and other sensors.

The terminal 60 can further include an audio circuit (not illustrated), and a speaker and a microphone which can provide an audio interface between the user and the terminal 60. The audio circuit can convert received audio data into an electric signal and transmit the electric signal to the speaker, which is converted by the speaker into an audio signal for output; and on the other hand, the microphone converts a collected audio signal into an electric signal which is received by the audio circuit and then converted into audio data, and the audio data is further output to the processor for processing and then transmitted to another terminal, for example, or the audio data is output to the memory for further processing. The audio circuit may further include an earphone jack for communication between a peripheral earphone and the terminal 60.

Moreover the terminal 60 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the terminal 60 can further include a web cam, a Bluetooth module, etc.

Moreover the terminal 60 can further include a Wireless Fidelity (WiFi) module (not illustrated). The WiFi falls into the category of short-range wireless transmission technologies, and the terminal can assist the user in receiving and transmitting an e-mail, browsing a webpage, accessing streaming media, etc., through the WiFi module by which the user is provided with a wireless access to the broadband Internet. It can be appreciated that the WiFi module may not be necessarily required for the terminal 60 but can be omitted as desired without departing from the scope of the application.

Moreover some embodiments of the application further provide a computer readable storage medium which can be a computer readable storage medium included in the memory in the embodiments above; or can be a separately existing computer readable storage medium which is not installed into the terminal. The computer readable storage medium stores therein one or more programs, and the one or more programs can be executed by one or more processors to perform the method according to any one of the embodiments above.

As can be apparent from the description above, since the terminal according to some embodiments of the application can be controlled via voice using an additional function to match the voice information in the received voice instruction with the preset voice information, the terminal can make different responses to voice instructions including different voice information to thereby improve the security of the terminal in use.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A terminal comprising:
   a processor; and
   non-volatile memory storing therein one or more computer readable program codes, the processor configured to execute the one or more computer readable codes to:
   during a first preset length of time, collect input speech via a microphone;
   recognize one of multiple different speakers for each piece of different voice information in the collected input speech;
   record in the memory, for each one of the multiple different speakers, an input duration during the first preset length of time of the piece of voice information corresponding to said one of the multiple different speakers; and
   set the piece of voice information corresponding to the speaker having a longest input duration during the first preset length of time as preset voice information of an owner of the terminal for a subsequent voice matching process.

2. The terminal according to claim 1, further comprising an audio circuit, wherein after setting the piece of voice information corresponding to the speaker having the longest input duration during the first preset length of time as the preset voice information of the owner of the terminal for the subsequent voice matching process, the processor is further configured to execute the one or more computer readable codes to:
   control the audio circuit to receive a voice instruction, the voice instruction comprising voice information and instruction information;
   match the voice information in the voice instruction with the preset voice information in the terminal; and
   in response to successful matching, perform an operation corresponding to the instruction information.

3. The terminal according to claim 2, wherein in response to successful matching, the processor is further configured to execute the one or more computer readable codes to:
   determine and display a first virtual animation corresponding to the instruction information according to a correspondence relationship between the instruction information and the first virtual animation.

4. The terminal according to claim 2, wherein the processor is further configured to execute the one or more computer readable codes to:
   determine the voice information in the voice instruction as other voice information than the preset voice information, and determine and display a second virtual animation corresponding to the other voice information according to a correspondence relationship between the other voice information and the second virtual animation.

5. The terminal according to claim 2, wherein the processor is further configured to execute the one or more computer readable codes to:
   in response to determining unsuccessful matching, reject the operation corresponding to the instruction information.

6. The terminal according to claim 2, wherein the processor is further configured to execute the one or more computer readable codes to:
   determine whether a condition to perform an operation of matching the voice information is satisfied, the condition to perform the operation of matching the voice operation including at least one of:
   a current time is in a preset period of time for which the operation of matching the voice information needs to be performed, a current geographic position of the terminal is in a preset range in which the operation of matching the voice information needs to be performed, and an option displayed on the terminal is selected by a user to trigger the terminal to perform the operation of matching the voice operation.

7. The terminal according to claim 2, wherein, after setting the piece of voice information corresponding to the speaker having the longest input duration during the first preset length of time as the preset voice information of the owner of the terminal for the subsequent voice matching process, the processor is further configured to execute the one or more computer readable codes to:
   during a second preset length of time, collect input speech via the microphone;
   recognize voice information in the input speech collected during the second preset length of time;

set the recognized voice information in the input speech collected during the second preset length of time as revised voice information; and match the voice information in the voice instruction with the preset voice information in the terminal by matching the voice information in the voice instruction with both the revised voice information and the preset voice information.

8. A method for voice control on a terminal, the method comprising:

during a first preset length of time, collecting input speech via a microphone;

recognizing one of multiple different speakers for each piece of different voice information in the collected input speech;

recording, for each one of the multiple different speakers, an input duration during the first preset length of time of the piece of voice information corresponding to said one of the multiple different speakers; and setting the piece of voice information corresponding to the speaker having a longest input duration during the first preset length of time as preset voice information of an owner of the terminal for a subsequent voice matching process.

9. The method according to claim 8, wherein after setting the piece of voice information corresponding to the speaker having the longest input duration during the first preset length of time as the preset voice information of the owner of the terminal for the subsequent voice matching process, the method further comprises:

controlling an audio circuit of the terminal to receive a voice instruction, the voice instruction comprising voice information and instruction information;

matching the voice information in the voice instruction with the preset voice information in the terminal; and when the matching is successful, performing an operation corresponding to the instruction information and displaying a visualization image corresponding to the operation on a display screen of the terminal.

10. The method according to claim 9, wherein the visualization image comprises a static image and a dynamic image.

11. The method according to claim 9, wherein the visualization image comprises a human image, an animal image, a plant image, a mechanical structure image, a cartoon image and/or an animated image.

12. The method according to claim 9, wherein the visualization image has an image expression corresponding to the operation.

13. The method according to claim 9, wherein before performing the operation corresponding to the instruction information, the method further comprises:

displaying a visualization image for welcome on the display screen.

14. The method according to claim 9, wherein the method further comprises:

in response to unsuccessful matching, displaying a visualization image for rejection on the display screen.

15. The method according to claim 8, after setting the piece of voice information corresponding to the speaker having the longest input duration during the first preset length of time as the preset voice information of the owner of the terminal for the subsequent voice matching process, the method further comprises:

controlling an audio circuit of the terminal to receive a voice instruction, the voice instruction comprising voice information and instruction information;

matching the voice information in the voice instruction with the preset voice information in the terminal; and when the matching is successful, performing an operation corresponding to the instruction information.

16. The method according to claim 15, wherein when the matching is successful, the method further comprises:

determining and displaying a first virtual animation corresponding to the instruction information according to a correspondence relationship between the instruction information and the first virtual animation.

17. The method according to claim 15, wherein in response to unsuccessful matching, the method further comprises:

determining the voice information in the voice instruction as other voice information than the preset voice information; and determining and displaying a second virtual animation corresponding to the other voice information according to a correspondence relationship between the other voice information and the second virtual animation.

* * * * *